(12) United States Patent
Zhao et al.

(10) Patent No.: US 10,347,198 B2
(45) Date of Patent: Jul. 9, 2019

(54) IMAGE DISPLAYING METHODS AND DISPLAY DEVICES

(71) Applicant: Shenzhen China Star Optoelectronics Technology Co., Ltd., Shenzhen, Guangdong (CN)

(72) Inventors: Wenqin Zhao, Guangdong (CN); Tao He, Guangdong (CN); Jhen-wei He, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/109,651

(22) PCT Filed: Jun. 12, 2016

(86) PCT No.: PCT/CN2016/085460
§ 371 (c)(1),
(2) Date: Apr. 13, 2018

(87) PCT Pub. No.: WO2017/193438
PCT Pub. Date: Nov. 16, 2017

(65) Prior Publication Data
US 2018/0322832 A1    Nov. 8, 2018

(30) Foreign Application Priority Data
May 12, 2016  (CN) .......................... 2016 1 0316772

(51) Int. Cl.
G09G 3/36       (2006.01)
G09G 5/02       (2006.01)
G02F 1/1335     (2006.01)

(52) U.S. Cl.
CPC ..... *G09G 3/3607* (2013.01); *G02F 1/133609* (2013.01); *G09G 5/026* (2013.01); *G09G 2300/0452* (2013.01); *G09G 2340/06* (2013.01)

(58) Field of Classification Search
CPC ............. G09G 2340/06; G09G 3/3607; G09G 2300/0452; G09G 5/026; G02F 1/133609
See application file for complete search history.

(56) References Cited

U.S. PATENT DOCUMENTS

2005/0068281 A1    3/2005  Shin et al.
2006/0187386 A1    8/2006  Roh
(Continued)

FOREIGN PATENT DOCUMENTS

CN    103747223 A    4/2014
CN    104809994 A    7/2015

*Primary Examiner* — Muhammad N Edun
(74) *Attorney, Agent, or Firm* — Andrew C. Cheng (57) ABSTRACT

The present disclosure includes an image displaying method and a display device. The method includes: obtaining three-color sub-pixel data of each of pixels of a current image, wherein the three-color sub-pixel data includes a first red, green, blue grayscale value (R1, G1, B1) separately; obtaining a first white grayscale value (W1) in accordance with the three-color sub-pixel data; performing a color gamut mapping toward the four first grayscale values in accordance with a predetermined rule; performing a sub-pixel rendering process toward the four-color first grayscale values to obtain the updated three-colors sub-pixel data corresponding to each of the pixels; and outputting the updated three-colors sub-pixel data to the display panel. The RGB data of the current image may be converted to the image data that can be displayed on the four-color display panel so as to obtain a vivid display on the four-color display panel.

19 Claims, 3 Drawing Sheets

(56) References Cited

U.S. PATENT DOCUMENTS

| | | | |
|---|---|---|---|
| 2009/0102769 A1* | 4/2009 | Kouno | G09G 3/3648 345/88 |
| 2009/0273607 A1* | 11/2009 | Ueki | G09G 3/2003 345/590 |
| 2013/0100179 A1 | 4/2013 | Tomizawa et al. | |
| 2016/0117975 A1 | 4/2016 | Kang | |
| 2016/0253942 A1* | 9/2016 | Tseng | G06T 11/001 345/601 |
| 2017/0004755 A1 | 1/2017 | He et al. | |

* cited by examiner

IMAGE DISPLAYING METHODS AND DISPLAY DEVICES

BACKGROUND OF THE INVENTION

1. Field of the Invention

The present disclosure relates to liquid crystal display technology, and more particularly to an image displaying method and the display device.

2. Discussion of the Related Art

Currently, within the liquid crystal panel, a red (R) sub-pixel, a green (G) sub-pixel, and a blue sub-pixel form a pixel cell, wherein the RGB data of the image to be displayed controls the grayscale values of the corresponding sub-pixels such that the colors may be mixed to display the image. With the development of the liquid crystal technology, a variety of demands toward the display panel have been proposed, such as high transmission rate, low power consumption, and good imaging performance. The transmission rate of the conventional RGB color-mixing method is low and the power consumption is high, which limits the enhancement of display panel.

A new four-color, including red, green, blue, and white, display panel has been proposed. By configuring the white sub-pixel, the transmission rate of the display panel is increased. The brightness may be the same, but the number of the lamps within the backlight source may be decreased, which reduces the power consumption.

Thus, how to process the RGB data of the image to be displayed to obtain the image data adapting to the four-color display panel so as to obtain vivid display on the four-color display panel is an issue to be resolved.

SUMMARY

The present disclosure relates to an image displaying method and a display device to display the RGB data on the four-color display panel.

In one aspect, an image displaying method includes: obtaining three-color sub-pixel data of each of pixels of a current image, wherein the three-color sub-pixel data includes a first red grayscale value (R1), a first green grayscale value (G1), and a first blue grayscale value (B1); obtaining a white grayscale coefficient according to the first red grayscale value (R1), the first green grayscale value (G1), and the first blue grayscale value (B1); obtaining a first white grayscale value (W1) in accordance with the white grayscale coefficient and a minimum value selecting from the first red grayscale value (R1), the first green grayscale value (G1), and the first blue grayscale value (B1); obtaining a second red grayscale value (R2), a second green grayscale value (G2), a second blue grayscale value (B2), and a second white grayscale value (W2) by performing a color gamut mapping toward the first red grayscale value (R1), the first green grayscale value (G1), the first blue grayscale value (B1), and the first white grayscale value (W1) in accordance with a predetermined rule; obtaining updated three-color sub-pixel data corresponding to each of the pixels by performing a sub-pixel rendering process toward the second red grayscale value (R2), the second green grayscale value (G2), the second blue grayscale value (B2), and the second white grayscale value (W2), and outputting the updated three-colors sub-pixel data to a display panel, the updated three-color sub-pixel data includes any three of the third red grayscale value (R3), the third green grayscale value (G3), the third blue grayscale value (B3), and the third white grayscale value (W3); wherein the step of obtaining the white grayscale coefficient according to the first red grayscale value (R1), the first green grayscale value (G1), and the first blue grayscale value (B1) further includes: obtaining a maximum value and the minimum value from the first red grayscale value (R1), the first green grayscale value (G1), and the first blue grayscale value (B1); calculating a difference value between the maximum value and the minimum value; calculating an average value of the difference values corresponding to each of the pixels within the current frame; and obtaining the white grayscale coefficient by a table lookup method in accordance with the average value; obtaining the second red grayscale value (R2), the second green grayscale value (G2), and the second blue grayscale value (B2) by an equation: X2=X1*(Max(R1, G1, B1)+W1)/Max(R1, G1, B1)−W1; wherein X1 respectively represents the first red grayscale value (R1), the first green grayscale value (G1), and the first blue grayscale value (B1), X2 respectively represents the second red grayscale value (R2), the second green grayscale value (G2), and the second blue grayscale value (B2), Max(R1, G1, B1) represents the maximum value selected from the first red grayscale value (R1), the first green grayscale value (G1), and the first blue grayscale value (B1), and W1 represents the first white grayscale value; and the second white grayscale value (W2) equals to the first white grayscale value (W1).

Wherein the first white grayscale value (W1) is calculated by the equation: W1=Min(R1, G1, B1)−Min(R1, G1, B1)*RA_W; wherein W1 relates to the first white grayscale value, and Min (R1, G1, B1) relates to the minimum value selected from the first red grayscale value (R1), the first green grayscale value (G1), and the first blue grayscale value (B1), and RA_W relates to the white grayscale coefficient.

Wherein the white grayscale coefficient increases along with the average value.

Wherein the pixels having the updated three-colors sub-pixel data are arranged with sequences including R3G3B3, W3R3G3, B3W3R3, and G3B3W3, wherein R3 relates to the third red grayscale value, G3 relates to the third green grayscale value, B3 relates to the third blue grayscale value, and W3 relates to the third white grayscale value.

Wherein the updated three-color sub-pixel data corresponding to the pixels are obtained by: obtaining a first value by determining the second grayscale value of the color excluded by the updated three-color sub-pixel data of the previous pixel; obtaining a second value by determining the second grayscale value of the color of the current pixel; obtaining a third value by determining the color of the current pixel in accordance with the first value and the second value; and the third grayscale value of the remaining colors of the current pixel equals to the second grayscale value of the corresponding color.

In another aspect, an image displaying method includes: obtaining three-color sub-pixel data of each of pixels of a current image, wherein the three-color sub-pixel data includes a first red grayscale value (R1), a first green grayscale value (G1), and a first blue grayscale value (B1); obtaining a white grayscale coefficient according to the first red grayscale value (R1), the first green grayscale value (G1), and the first blue grayscale value (B1); obtaining a first white grayscale value (W1) in accordance with the white grayscale coefficient and a minimum value selecting from the first red grayscale value (R1), the first green grayscale value (G1), and the first blue grayscale value (B1); obtaining a second red grayscale value (R2), a second green grayscale value (G2), a second blue grayscale value (B2), and a second white grayscale value (W2) by performing a color gamut mapping toward the first red grayscale value (R1), the first green grayscale value (G1), the first blue grayscale value (B1), and the first white grayscale value (W1) in accordance with a predetermined rule; and obtaining updated three-color sub-pixel data corresponding to each of the pixels by performing a sub-pixel rendering process toward the second red grayscale value (R2), the second green grayscale value (G2), the second blue grayscale value (B2), and the second white grayscale value (W2), and outputting the updated three-colors sub-pixel data to a display panel, the updated three-color sub-pixel data includes any three of the third red grayscale value (R3), the third green grayscale value (G3), the third blue grayscale value (B3), and the third white grayscale value (W3).

Wherein the step of obtaining the white grayscale coefficient according to the first red grayscale value (R1), the first green grayscale value (G1), and the first blue grayscale value (B1) further includes: obtaining a maximum value and the minimum value from the first red grayscale value (R1), the first green grayscale value (G1), and the first blue grayscale value (B1); calculating a difference value between the maximum value and the minimum value; calculating an average value of the difference values corresponding to each of the pixels within the current frame; and obtaining the white grayscale coefficient by a table lookup method in accordance with the average value.

Wherein the first white grayscale value (W1) is calculated by the equation: W1=Min(R1, G1, B1)−Min(R1, G1, B1)*RA_W; wherein W1 relates to the first white grayscale value, and Min (R1, G1, B1) relates to the minimum value selected from the first red grayscale value (R1), the first green grayscale value (G1), and the first blue grayscale value (B1), and RA_W relates to the white grayscale coefficient.

Wherein the white grayscale coefficient increases along with the average value.

Wherein the method further includes obtaining the second red grayscale value (R2), the second green grayscale value (G2), and the second blue grayscale value (B2) by an equation: X2=X1*(Max(R1, G1, B1)+W1)/Max(R1, G1, B1)−W1; wherein X1 respectively represents the first red grayscale value (R1), the first green grayscale value (G1), and the first blue grayscale value (B1), X2 respectively represents the second red grayscale value (R2), the second green grayscale value (G2), and the second blue grayscale value (B2), Max(R1, G1, B1) represents the maximum value selected from the first red grayscale value (R1), the first green grayscale value (G1), and the first blue grayscale value (B1), and W1 represents the first white grayscale value; and the second white grayscale value (W2) equals to the first white grayscale value (W1).

Wherein the pixels having the updated three-colors sub-pixel data are arranged with sequences including R3G3B3, W3R3G3, B3W3R3, and G3B3W3, wherein R3 relates to the third red grayscale value, G3 relates to the third green grayscale value, B3 relates to the third blue grayscale value, and W3 relates to the third white grayscale value.

Wherein the pixels corresponding to the updated three-colors sub-pixel data are obtained by: obtaining a first value by determining the second grayscale value of the color excluded by the updated three-color sub-pixel data of the previous pixel; obtaining a second value by determining the second grayscale value of the color of the current pixel; obtaining a third value by determining the color of the current pixel in accordance with the first value and the second value; and the third grayscale value of the remaining colors of the current pixel equals to the second grayscale value of the corresponding color.

In one aspect, an image display device includes: a first grayscale value obtaining unit configured for receiving three-color sub-pixel data of each of the pixels of a current image, the three-color sub-pixel data includes the first red grayscale value (R1), the first green grayscale value (G1), and the first blue grayscale value (B1), a white grayscale coefficient is obtained in accordance with the first red grayscale value (R1), the first green grayscale value (G1), and the first blue grayscale value (B1), a first white grayscale value (W1) is obtained in accordance with the white grayscale coefficient and the minimum value selected from the first red grayscale value (R1), the first green grayscale value (G1), and the first blue grayscale value (B1); a color gamut unit connects to the first grayscale value obtaining unit, and obtains a second red grayscale value (R2), a second green grayscale value (G2), a second blue grayscale value (B2), and a second white grayscale value (W2) by performing a color gamut mapping toward the first red grayscale value (R1), the first green grayscale value (G1), the first blue grayscale value (B1), and the first white grayscale value (W1) in accordance with a predetermined rule; a sub-pixel rendering unit connects to the color gamut unit, and obtains updated three-color sub-pixel data corresponding to each of the pixels by performing a sub-pixel rendering process toward the second red grayscale value (R2), the second green grayscale value (G2), the second blue grayscale value (B2), and the second white grayscale value (W2), and the updated three-color sub-pixel data are outputted to the display panel, the updated three-color sub-pixel data includes any three of the third red grayscale value (R3), the third green grayscale value (G3), the third blue grayscale value (B3), and the third white grayscale value (W3).

Wherein the first grayscale value obtaining unit obtains the white grayscale coefficient according to the first red grayscale value (R1), the first green grayscale value (G1), and the first blue grayscale value (B1) by: obtaining a maximum value and the minimum value from the first red grayscale value (R1), the first green grayscale value (G1), and the first blue grayscale value (B1); calculating a difference value between the maximum value and the minimum value;

calculating an average value of the difference values corresponding to each of the pixels within the current frame; and obtaining the white grayscale coefficient by a table lookup method in accordance with the average value.

Wherein the first white grayscale value (W1) is calculated by the equation: W1=Min(R1, G1, B1)−Min(R1, G1, B1)*RA_W; wherein W1 relates to the first white grayscale value, and Min (R1, G1, B1) relates to the minimum value selected from the first red grayscale value (R1), the first green grayscale value (G1), and the first blue grayscale value (B1), and RA_W relates to the white grayscale coefficient.

Wherein the white grayscale coefficient increases along with the average value.

Wherein the color gamut unit obtains the second red grayscale value (R2), the second green grayscale value (G2), and the second blue grayscale value (B2) by the equation: X2=X1*(Max(R1, G1, B1)+W1)/Max(R1, G1, B1)−W1; wherein X1 respectively represents the first red grayscale value (R1), the first green grayscale value (G1), and the first blue grayscale value (B1), X2 respectively represents the second red grayscale value (R2), the second green grayscale value (G2), and the second blue grayscale value (B2), Max(R1, G1, B1) represents the maximum value selected from the first red grayscale value (R1), the first green grayscale value (G1), and the first blue grayscale value (B1), and W1 represents the first white grayscale value; and the second white grayscale value (W2) equals to the first white grayscale value (W1).

Wherein the pixels having the updated three-colors sub-pixel data are arranged with sequences including R3G3B3, W3R3G3, B3W3R3, and G3B3W3, wherein R3 relates to the third red grayscale value, G3 relates to the third green grayscale value, B3 relates to the third blue grayscale value, and W3 relates to the third white grayscale value.

Wherein the sub-pixel rendering unit obtains the updated three-colors sub-pixel data corresponding to the pixels by: obtaining a first value by determining the second grayscale value of the color excluded by the updated three-color sub-pixel data of the previous pixel; obtaining a second value by determining the second grayscale value of the color of the current pixel; obtaining a third value by determining the color of the current pixel in accordance with the first value and the second value; and the third grayscale value of the remaining colors of the current pixel equals to the second grayscale value of the corresponding color.

In view of the above, the image displaying method and the display device converts the RGB three-color sub-pixel data into the updated three-color sub-pixel data to adapt to the four-color panel. First, the grayscale value of the white sub-pixel is obtained, and the color gamut mapping is applied toward the four-color sub-pixel data. In the end, the sub-pixel rendering process is applied toward the four-color sub-pixel data to obtain the updated three-color sub-pixel data corresponding to each of the pixels. The updated three-color sub-pixel data are then outputted to the display panel. In this way, the color gamut of the white sub-pixel and the brightness may be guaranteed such that the display performance may be enhanced. In addition, the transmission rate is high and the power consumption is low.

DETAILED DESCRIPTION OF THE EMBODIMENTS

Embodiments of the invention will now be described more fully hereinafter with reference to the accompanying drawings, in which embodiments of the invention are shown.

Figure 1:
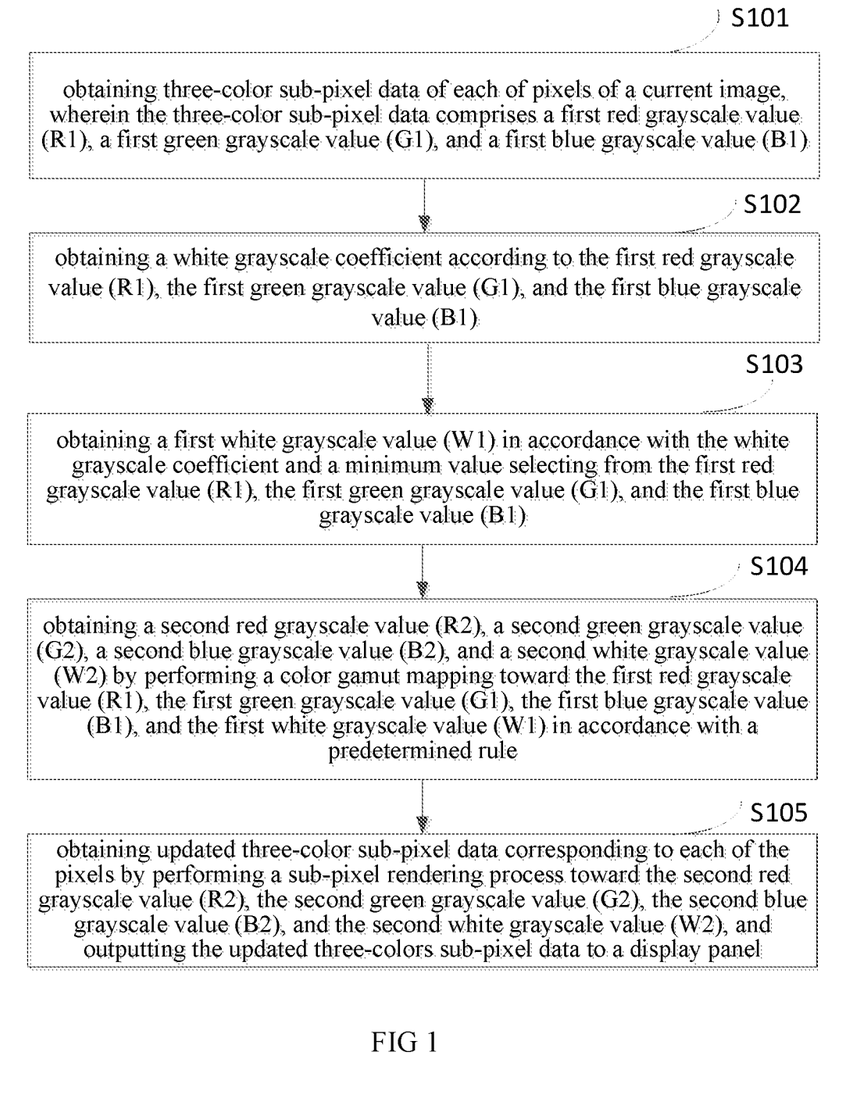
FIG. 1 is a flowchart of the image displaying method in accordance with one embodiment.

FIG. 1 is a flowchart of the image displaying method in accordance with one embodiment. It is to be noted that the method of FIG. 1 is not limited to the sequence of the steps while the substantial technical effects are the same. As shown in FIG. 1, the method includes the following steps.

In step S101, obtaining three-color sub-pixel data of each of pixels of a current image, wherein the three-color sub-pixel data includes a first red grayscale value (R1), a first green grayscale value (G1), and a first blue grayscale value (B1).

In step S102, obtaining a white grayscale coefficient according to the first red grayscale value (R1), the first green grayscale value (G1), and the first blue grayscale value (B1).

In step S102, the step of obtaining the white grayscale coefficient according to the first red grayscale value (R1), the first green grayscale value (G1), and the first blue grayscale value (B1) includes: obtaining a maximum value and a minimum value from the first red grayscale value (R1), the first green grayscale value (G1), and the first blue grayscale value (B1); calculating a difference value and an average value of the difference values corresponding to each of the pixels within the current frame; and obtaining the white grayscale coefficient by a table lookup method in accordance with the average value.

Figure 2:
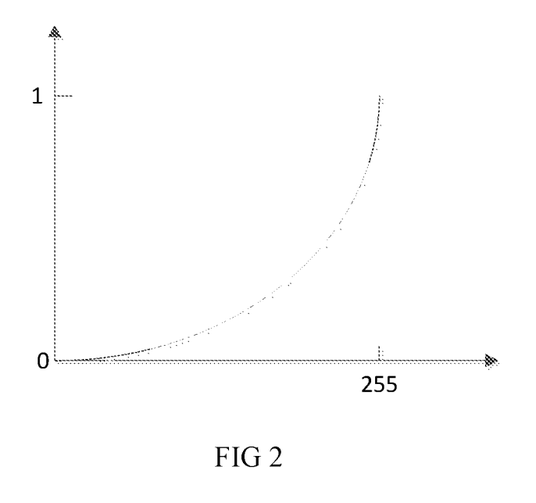
FIG. 2 is a curve diagram showing the white grayscale coefficient and the average value in accordance with one embodiment.

FIG. 2 is a curve diagram showing the white grayscale coefficient and the average value in accordance with one embodiment. As shown in FIG. 2, the x-axis relates to the average value ranging from 0 to 255, and the y-axis relates to the white grayscale coefficient ranging from 0 to 1, wherein the white grayscale coefficient increases along with the average value.

When the current data frame indicates the image is a single-color image, the difference between the maximum value and the minimum value of the first red grayscale value (R1), the first green grayscale value (G1), and the first blue grayscale value (B1) is larger such that the white grayscale coefficient is smaller. When the current data frame indicates the image is a mixed-color image, the difference between the maximum value and the minimum value of the first red grayscale value (R1), the first green grayscale value (G1), and the first blue grayscale value (B1) is smaller such that the white grayscale coefficient is smaller.

It can be understood for persons skilled in the art that the curve diagram in FIG. 2 is only one example, and the present disclosure is not limited thereto.

In step S103, obtaining a first white grayscale value (W1) in accordance with the white grayscale coefficient and the minimum value selecting from the first red grayscale value (R1), the first green grayscale value (G1), and the first blue grayscale value (B1).

In step S103, the first white grayscale value (W1) is calculated by the equation below:

$$W1 = \mathrm{Min}(R1, G1, B1) - \mathrm{Min}(R1, G1, B1) * RA\_W;$$

Wherein first white grayscale value (W1) relates to the first white grayscale value, and Min (R1, G1, B1) relates to the minimum value selected from the first red grayscale value (R1), the first green grayscale value (G1), and the first blue grayscale value (B1), and RA_W relates to the white grayscale coefficient.

When the current data frame indicates the image is a single-color image, the white grayscale coefficient is smaller such that the first white grayscale value is larger. When the current data frame indicates the image is a mixed-color image, the white grayscale coefficient is larger such that the first white grayscale value is smaller. In this way, the brightness of the mixed-color image may be enhanced, the white component of the single-color image may be reduced so as to guarantee the saturation of the single-color image.

In step S104, obtaining a second red grayscale value (R2), a second green grayscale value (G2), a second blue grayscale value (B2), and a second white grayscale value (W2) by performing a color gamut mapping toward the first red grayscale value (R1), the first green grayscale value (G1), the first blue grayscale value (B1), and the first white grayscale value (W1) in accordance with a predetermined rule.

In step S104, the second red grayscale value (R2), the second green grayscale value (G2), and the second blue grayscale value (B2) are calculated by the equation below:

$$X2=X1*(\text{Max}(R1,G1,B1)+W1)/\text{Max}(R1,G1,B1)-W1;$$

Wherein X1 respectively represents the first red grayscale value (R1), the first green grayscale value (G1), and the first blue grayscale value (B1). Corresponding, X2 respectively represents the second red grayscale value (R2), the second green grayscale value (G2), and the second blue grayscale value (B2). Max(R1, G1, B1) represents the maximum value selected from the first red grayscale value (R1), the first green grayscale value (G1), and the first blue grayscale value (B1), and W1 represents the first white grayscale value (W1).

In the embodiment, the second white grayscale value (W2) equals to the first white grayscale value (W1).

It can be conceived that the color gamut may be lowered down when the white color is configured and the first grayscale values (R1, G1, B1) are not processed. Thus, the color gamut mapping has to be performed toward the first grayscale values in accordance with the predetermined rule so as to obtain the second red grayscale value (R2), the second green grayscale value (G2), and the second blue grayscale value (B2).

It can also be conceived that the predetermined rule may be the equations other than the above, that is, the present disclosure is not limited to the above equations.

In step S104, obtaining updated three-color sub-pixel data corresponding to each of the pixels by performing a sub-pixel rendering process toward the second red grayscale value (R2), the second green grayscale value (G2), the second blue grayscale value (B2), and the second white grayscale value (W2).

In step S105, the updated three-color sub-pixel data includes any three of the third red grayscale value (R3), the third green grayscale value (G3), the third blue grayscale value (B3), and the third white grayscale value (W3).

It can be conceived that each of the pixels of the display panel includes only three sub-pixels, and thus the second red grayscale value (R2), the second green grayscale value (G2), the second blue grayscale value (B2) and the second white grayscale value (W2) cannot be outputted directly to the display panel. That is, the four second grayscale values have to be rendered to obtain the updated three-color sub-pixel data corresponding to each of the pixels.

Figure 3:
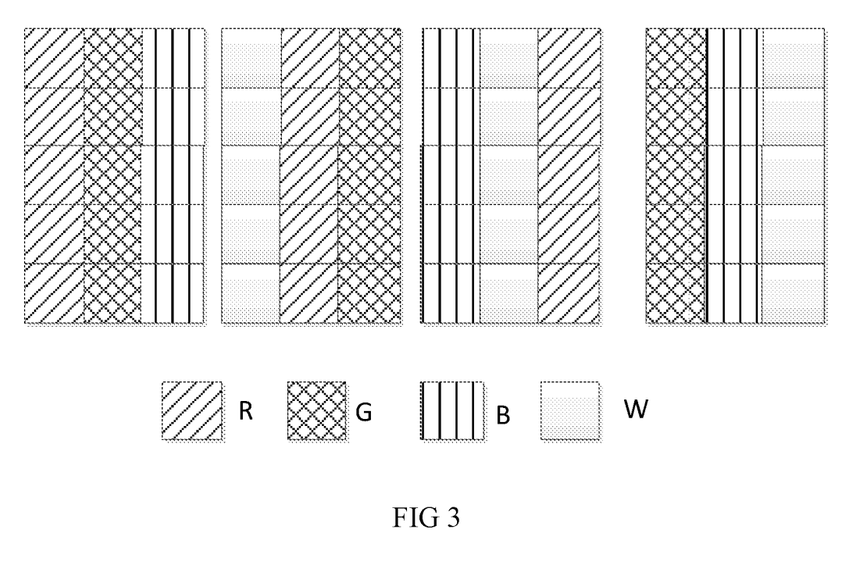
FIG. 3 is a schematic view showing the arrangement of the pixels outputted to the display panel in accordance with a first embodiment.

FIG. 3 is a schematic view showing the arrangement of the pixels outputted to the display panel in accordance with a first embodiment. As shown in FIG. 3, the pixels are arranged with the sequence R3G3B3, W3R3G3, B3W3R3, and G3B3W3, wherein R3 relates to the third red grayscale value, G3 relates to the third green grayscale value, B3 relates to the third blue grayscale value, and W3 relates to the third white grayscale value.

Wherein the updated three-color sub-pixel data is obtained by the method including: obtaining a first value by determining the second grayscale value of the color excluded by the updated three-color sub-pixel data of the previous pixel; obtaining a second value by determining the second grayscale value of the color of the current pixel; obtaining a third value by determining the color of the current pixel in accordance with the first value and second value; and the third grayscale value of the remaining colors of the current pixel equals to the second grayscale value of the corresponding color.

In one example, the current pixel includes white, red, and green, and the previous pixel includes red, green, and blue. That is, the current pixel is denoted as W3R3G3, and the previous pixel is denoted as R3G3B3. As the white is excluded from the previous pixel, and the third white grayscale value (W3) of the current pixel is obtained by the second white grayscale value (W21) of the previous pixel and the second white grayscale value (W22) of the current pixel, wherein W3=ra11*W21+ra12*W22, and ra11 and ra12 are constants. That is, as the white is excluded from the previous pixel, the white of the previous pixel has to be formed by rendering the white of the current pixel. The third red grayscale value (R3) of the current pixel equals to the second red grayscale value (R2), and the third green grayscale value (G3) of the current pixel equals to the second green grayscale value (G2).

Figure 4:
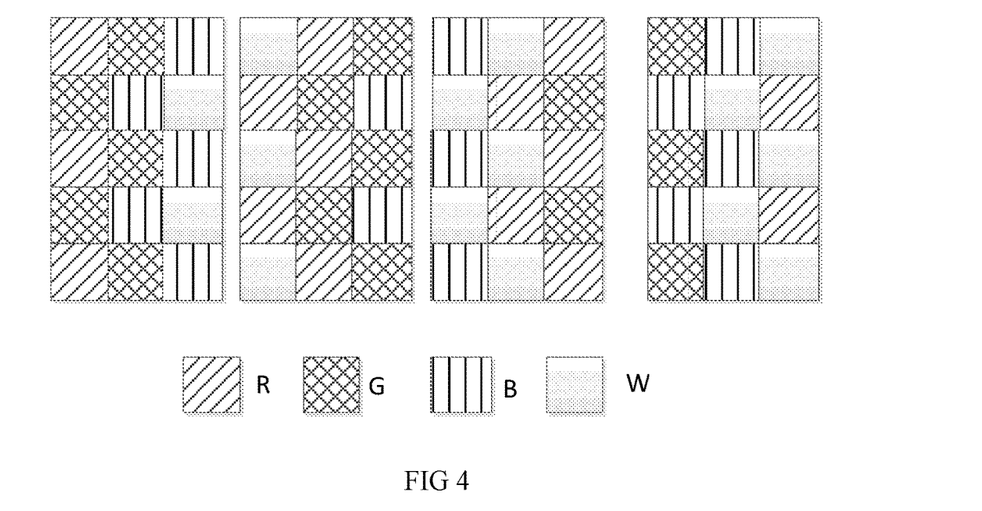
FIG. 4 is a schematic view showing the arrangement of the pixels outputted to the display panel in accordance with a second embodiment.

FIG. 4 is a schematic view showing the arrangement of the pixels outputted to the display panel in accordance with a second embodiment. The pixels, having the updated three-color sub-pixel data, in odd rows are arranged with the sequence R3G3B3, W3R3G3, B3W3R3, and G3B3W, and the pixels in even rows are arranged with the sequence G3B3W3, R3G3B3, W3R3G3, and B3W3R3, wherein R3 relates to the third red grayscale value, G3 relates to the third green grayscale value, the third blue grayscale value relates to the third blue grayscale value, and W3 relates to the third white grayscale value.

Wherein the updated three-color sub-pixel data of the pixels may be obtained by the method similar to the first embodiment, as shown in FIG. 3.

Figure 5:
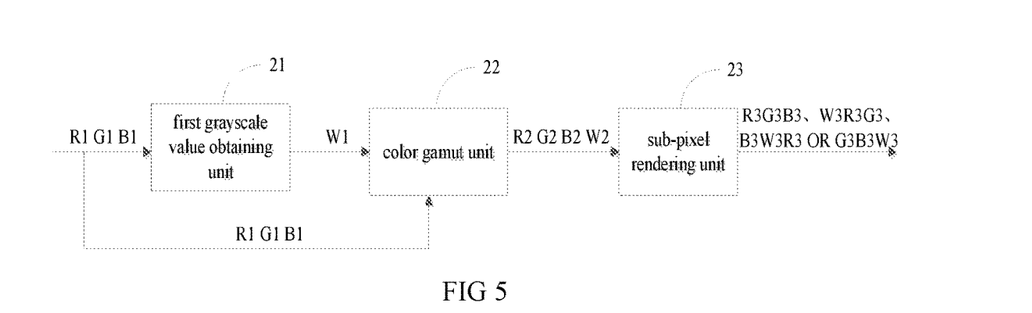
FIG. 5 is a schematic view of the image display device in accordance with one embodiment.

FIG. 5 is a schematic view of the image display device in accordance with one embodiment. The image displaying device includes a first grayscale value obtaining unit 21, a color gamut unit 22, and a sub-pixel rendering unit 23.

The first grayscale value obtaining unit 21 is configured for receiving the three-color sub-pixel data of each of the pixels of the current image. The three-color sub-pixel data includes the first red grayscale value (R1), the first green grayscale value (G1), and the first blue grayscale value (B1). The white grayscale coefficient is obtained in accordance with the first red grayscale value (R1), the first green grayscale value (G1), and the first blue grayscale value (B1). The first white grayscale value (W1) is obtained in accordance with the white grayscale coefficient and the minimum value selected from the first red grayscale value (R1), the first green grayscale value (G1), and the first blue grayscale value (B1).

Specifically, the first grayscale value obtaining unit 21 obtains the maximum value and the minimum value from the first red grayscale value (R1), the first green grayscale value (G1), and the first blue grayscale value (B1). The first grayscale value obtaining unit 21 calculates the difference value and the average value corresponding to each of the pixels within the current frame. The first grayscale value obtaining unit 21 also obtains the white grayscale coefficient by the table lookup method in accordance with the average value.

The white grayscale coefficient increases along with the average value.

The first white grayscale value (W1) is calculated by the equation below:

$$W1=\text{Min}(R1,G1,B1)-\text{Min}(R1,G1,B1)*RA\_W;$$

Wherein W1 relates to the first white grayscale value, and Min (R1, G1, B1) relates to the minimum value selected from the first red grayscale value (R1), the first green grayscale value (G1), and the first blue grayscale value (B1), and RA_W relates to the white grayscale coefficient.

The color gamut unit 22 connects to the first grayscale value obtaining unit 21, and obtains a second red grayscale value (R2), a second green grayscale value (G2), a second blue grayscale value (B2), and a second white grayscale value (W2) by performing a color gamut mapping toward the first red grayscale value (R1), the first green grayscale value (G1), the first blue grayscale value (B1), and the first white grayscale value (W1) in accordance with a predetermined rule.

Specifically, the color gamut unit 22 calculates the second red grayscale value (R2), the second green grayscale value (G2), and the second blue grayscale value (B2) by the equation below:

$$X2=X1*(\text{Max}(R1,G1,B1)+W1)/\text{Max}(R1,G1,B1)-W1;$$

Wherein X1 respectively represents the first red grayscale value (R1), the first green grayscale value (G1), and the first blue grayscale value (B1). Corresponding, X2 respectively represents the second red grayscale value (R2), the second green grayscale value (G2), and the second blue grayscale value (B2). Max(R1, G1, B1) represents the maximum value selected from the first red grayscale value (R1), the first green grayscale value (G1), and the first blue grayscale value (B1), and W1 represents the first white grayscale value (W1).

In the embodiment, the second white grayscale value (W2) equals to the first white grayscale value (W1).

The sub-pixel rendering unit 23 connects to the color gamut unit 22, and obtains updated three-color sub-pixel data corresponding to each of the pixels by performing a sub-pixel rendering process toward the second red grayscale value (R2), the second green grayscale value (G2), the second blue grayscale value (B2), and the second white grayscale value (W2). The updated three-color sub-pixel data are outputted to the display panel.

The updated three-color sub-pixel data includes any three of the third red grayscale value (R3), the third green grayscale value (G3), the third blue grayscale value (B3), and the third white grayscale value (W3). In one example, the pixels are arranged with the sequence R3G3B3, W3R3G3, B3W3R3, and G3B3W3, wherein R3 relates to the third red grayscale value, G3 relates to the third green grayscale value, B3 relates to the third blue grayscale value, and W3 relates to the third white grayscale value.

The process of obtaining the updated three-color sub-pixel data executed by the sub-pixel rendering unit 23 includes: obtaining a first value by determining the second grayscale value of the color excluded by the three-color sub-pixel data of the previous pixel; obtaining a second value by determining the second grayscale value of the color of the current pixel; obtaining a third value by determining the color of the current pixel in accordance with the first value and the second value; and the third grayscale value of the remaining colors of the current pixel equals to the second grayscale value of the corresponding color.

In view of the above, the image displaying method and the display device converts the RGB three-color sub-pixel data into the updated three-color sub-pixel data to adapt to the four-color panel. First, the grayscale value of the white sub-pixel is obtained, and the color gamut mapping is applied toward the four-color sub-pixel data. In the end, the sub-pixel rendering process is applied toward the four-color sub-pixel data to obtain the updated three-color sub-pixel data corresponding to each of the pixels. The updated three-color sub-pixel data are then outputted to the display panel. In this way, the color gamut of the white sub-pixel and the brightness may be guaranteed such that the display performance may be enhanced. In addition, the transmission rate is high and the power consumption is low.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An image displaying method, comprising:
obtaining three-color sub-pixel data of each of pixels of a current image, wherein the three-color sub-pixel data comprises a first red grayscale value (R1), a first green grayscale value (G1), and a first blue grayscale value (B1);
obtaining a white grayscale coefficient according to the first red grayscale value (R1), the first green grayscale value (G1), and the first blue grayscale value (B1);
obtaining a first white grayscale value (W1) in accordance with the white grayscale coefficient and a minimum value selecting from the first red grayscale value (R1), the first green grayscale value (G1), and the first blue grayscale value (B1);
obtaining a second red grayscale value (R2), a second green grayscale value (G2), a second blue grayscale value (B2), and a second white grayscale value (W2) by performing a color gamut mapping toward the first red grayscale value (R1), the first green grayscale value (G1), the first blue grayscale value (B1), and the first white grayscale value (W1) in accordance with a predetermined rule;
obtaining updated three-color sub-pixel data corresponding to each of the pixels by performing a sub-pixel rendering process toward the second red grayscale value (R2), the second green grayscale value (G2), the second blue grayscale value (B2), and the second white grayscale value (W2), and outputting the updated three-colors sub-pixel data to a display panel, the updated three-color sub-pixel data comprises any three of the third red grayscale value (R3), the third green grayscale value (G3), the third blue grayscale value (B3), and the third white grayscale value (W3);
wherein the step of obtaining the white grayscale coefficient according to the first red grayscale value (R1), the first green grayscale value (G1), and the first blue grayscale value (B1) further comprises:
obtaining a maximum value and the minimum value from the first red grayscale value (R1), the first green grayscale value (G1), and the first blue grayscale value (B1);
calculating a difference value between the maximum value and the minimum value;
calculating an average value of the difference values corresponding to each of the pixels within the current frame; and
and obtaining the white grayscale coefficient by a table lookup method in accordance with the average value;
obtaining the second red grayscale value (R2), the second green grayscale value (G2), and the second blue grayscale value (B2) by an equation:

$$X2=X1*(\text{Max}(R1,G1,B1)+W1)/\text{Max}(R1,G1,B1)-W1;$$

wherein X1 respectively represents the first red grayscale value (R1), the first green grayscale value (G1), and the first blue grayscale value (B1), X2 respectively represents the second red grayscale value (R2), the second green grayscale value (G2), and the second blue grayscale value (B2), Max(R1, G1, B1) represents the maximum value selected from the first red grayscale value (R1), the first green grayscale value (G1), and the first blue grayscale value (B1), and W1 represents the first white grayscale value; and the second white grayscale value (W2) equals to the first white grayscale value (W1).

2. The method as claimed in claim 1, wherein the first white grayscale value (W1) is calculated by the equation:

$$W1=\text{Min}(R1,G1,B1)-\text{Min}(R1,G1,B1)*RA\_W;$$

wherein W1 relates to the first white grayscale value, and Min (R1, G1, B1) relates to the minimum value selected from the first red grayscale value (R1), the first green grayscale value (G1), and the first blue grayscale value (B1), and RA_W relates to the white grayscale coefficient.

3. The method as claimed in claim 2, wherein the white grayscale coefficient increases along with the average value.

4. The method as claimed in claim 1, wherein the pixels having the updated three-colors sub-pixel data are arranged with sequences including R3G3B3, W3R3G3, B3W3R3, and G3B3W3, wherein R3 relates to the third red grayscale value, G3 relates to the third green grayscale value, B3 relates to the third blue grayscale value, and W3 relates to the third white grayscale value.

5. The method as claimed in claim 4, wherein the updated three-color sub-pixel data corresponding to the pixels are obtained by:
  obtaining a first value by determining the second grayscale value of the color excluded by the updated three-color sub-pixel data of the previous pixel;
  obtaining a second value by determining the second grayscale value of the color of the current pixel;
  obtaining a third value by determining the color of the current pixel in accordance with the first value and the second value; and
  the third grayscale value of the remaining colors of the current pixel equals to the second grayscale value of the corresponding color.

6. An image displaying method, comprising:
  obtaining three-color sub-pixel data of each of pixels of a current image, wherein the three-color sub-pixel data comprises a first red grayscale value (R1), a first green grayscale value (G1), and a first blue grayscale value (B1);
  obtaining a white grayscale coefficient according to the first red grayscale value (R1), the first green grayscale value (G1), and the first blue grayscale value (B1);
  obtaining a first white grayscale value (W1) in accordance with the white grayscale coefficient and a minimum value selecting from the first red grayscale value (R1), the first green grayscale value (G1), and the first blue grayscale value (B1);
  obtaining a second red grayscale value (R2), a second green grayscale value (G2), a second blue grayscale value (B2), and a second white grayscale value (W2) by performing a color gamut mapping toward the first red grayscale value (R1), the first green grayscale value (G1), the first blue grayscale value (B1), and the first white grayscale value (W1) in accordance with a predetermined rule; and
  obtaining updated three-color sub-pixel data corresponding to each of the pixels by performing a sub-pixel rendering process toward the second red grayscale value (R2), the second green grayscale value (G2), the second blue grayscale value (B2), and the second white grayscale value (W2), and outputting the updated three-colors sub-pixel data to a display panel, the updated three-color sub-pixel data comprises any three of the third red grayscale value (R3), the third green grayscale value (G3), the third blue grayscale value (B3), and the third white grayscale value (W3).

7. The method as claimed in claim 6, wherein the step of obtaining the white grayscale coefficient according to the first red grayscale value (R1), the first green grayscale value (G1), and the first blue grayscale value (B1) further comprises:
  obtaining a maximum value and the minimum value from the first red grayscale value (R1), the first green grayscale value (G1), and the first blue grayscale value (B1);
  calculating a difference value between the maximum value and the minimum value;
  calculating an average value of the difference values corresponding to each of the pixels within the current frame; and
  and obtaining the white grayscale coefficient by a table lookup method in accordance with the average value.

8. The method as claimed in claim 7, wherein the first white grayscale value (W1) is calculated by the equation:

$$W1=\text{Min}(R1,G1,B1)-\text{Min}(R1,G1,B1)*RA\_W;$$

wherein W1 relates to the first white grayscale value, and Min (R1, G1, B1) relates to the minimum value selected from the first red grayscale value (R1), the first green grayscale value (G1), and the first blue grayscale value (B1), and RA_W relates to the white grayscale coefficient.

9. The method as claimed in claim 8, wherein the white grayscale coefficient increases along with the average value.

10. The method as claimed in claim 6, the method further comprises obtaining the second red grayscale value (R2), the second green grayscale value (G2), and the second blue grayscale value (B2) by an equation:

$$X2=X1*(\text{Max}(R1,G1,B1)+W1)/\text{Max}(R1,G1,B1)-W1;$$

wherein X1 respectively represents the first red grayscale value (R1), the first green grayscale value (G1), and the first blue grayscale value (B1), X2 respectively represents the second red grayscale value (R2), the second green grayscale value (G2), and the second blue grayscale value (B2), Max(R1, G1, B1) represents the maximum value selected from the first red grayscale value (R1), the first green grayscale value (G1), and the first blue grayscale value (B1), and W1 represents the first white grayscale value; and the second white grayscale value (W2) equals to the first white grayscale value (W1).

11. The method as claimed in claim 6, wherein the pixels having the updated three-colors sub-pixel data are arranged with sequences including R3G3B3, W3R3G3, B3W3R3, and G3B3W3, wherein R3 relates to the third red grayscale value, G3 relates to the third green grayscale value, B3 relates to the third blue grayscale value, and W3 relates to the third white grayscale value.

12. The method as claimed in claim 11, wherein the pixels corresponding to the updated three-colors sub-pixel data are obtained by:

obtaining a first value by determining the second grayscale value of the color excluded by the updated three-color sub-pixel data of the previous pixel;

obtaining a second value by determining the second grayscale value of the color of the current pixel;

obtaining a third value by determining the color of the current pixel in accordance with the first value and the second value; and the third grayscale value of the remaining colors of the current pixel equals to the second grayscale value of the corresponding color.

13. An image display device, comprising:

a first grayscale value obtaining unit configured for receiving three-color sub-pixel data of each of the pixels of a current image, the three-color sub-pixel data comprises the first red grayscale value (R1), the first green grayscale value (G1), and the first blue grayscale value (B1), a white grayscale coefficient is obtained in accordance with the first red grayscale value (R1), the first green grayscale value (G1), and the first blue grayscale value (B1), a first white grayscale value (W1) is obtained in accordance with the white grayscale coefficient and the minimum value selected from the first red grayscale value (R1), the first green grayscale value (G1), and the first blue grayscale value (B1);

a color gamut unit connects to the first grayscale value obtaining unit, and obtains a second red grayscale value (R2), a second green grayscale value (G2), a second blue grayscale value (B2), and a second white grayscale value (W2) by performing a color gamut mapping toward the first red grayscale value (R1), the first green grayscale value (G1), the first blue grayscale value (B1), and the first white grayscale value (W1) in accordance with a predetermined rule;

a sub-pixel rendering unit connects to the color gamut unit, and obtains updated three-color sub-pixel data corresponding to each of the pixels by performing a sub-pixel rendering process toward the second red grayscale value (R2), the second green grayscale value (G2), the second blue grayscale value (B2), and the second white grayscale value (W2), and the updated three-color sub-pixel data are outputted to the display panel, the updated three-color sub-pixel data comprises any three of the third red grayscale value (R3), the third green grayscale value (G3), the third blue grayscale value (B3), and the third white grayscale value (W3).

14. The device as claimed in claim 13, wherein the first grayscale value obtaining unit obtains the white grayscale coefficient according to the first red grayscale value (R1), the first green grayscale value (G1), and the first blue grayscale value (B1) by:

obtaining a maximum value and the minimum value from the first red grayscale value (R1), the first green grayscale value (G1), and the first blue grayscale value (B1);

calculating a difference value between the maximum value and the minimum value;

calculating an average value of the difference values corresponding to each of the pixels within the current frame; and and obtaining the white grayscale coefficient by a table lookup method in accordance with the average value.

15. The device as claimed in claim 14, wherein the first white grayscale value (W1) is calculated by the equation:

$$W1=\text{Min}(R1,G1,B1)-\text{Min}(R1,G1,B1)*RA\_W;$$

wherein W1 relates to the first white grayscale value, and Min (R1, G1, B1) relates to the minimum value selected from the first red grayscale value (R1), the first green grayscale value (G1), and the first blue grayscale value (B1), and RA_W relates to the white grayscale coefficient.

16. The device as claimed in claim 15, wherein the white grayscale coefficient increases along with the average value.

17. The device as claimed in claim 13, wherein the color gamut unit obtains the second red grayscale value (R2), the second green grayscale value (G2), and the second blue grayscale value (B2) by the equation:

$$X2=X1*(\text{Max}(R1,G1,B1)+W1)/\text{Max}(R1,G1,B1)-W1;$$

wherein X1 respectively represents the first red grayscale value (R1), the first green grayscale value (G1), and the first blue grayscale value (B1), X2 respectively represents the second red grayscale value (R2), the second green grayscale value (G2), and the second blue grayscale value (B2), Max(R1, G1, B1) represents the maximum value selected from the first red grayscale value (R1), the first green grayscale value (G1), and the first blue grayscale value (B1), and W1 represents the first white grayscale value; and the second white grayscale value (W2) equals to the first white grayscale value (W1).

18. The device as claimed in claim 13, wherein the pixels having the updated three-colors sub-pixel data are arranged with sequences including R3G3B3, W3R3G3, B3W3R3, and G3B3W3, wherein R3 relates to the third red grayscale value, G3 relates to the third green grayscale value, B3 relates to the third blue grayscale value, and W3 relates to the third white grayscale value.

19. The device as claimed in claim 18, wherein the sub-pixel rendering unit obtains the updated three-colors sub-pixel data corresponding to the pixels by:

obtaining a first value by determining the second grayscale value of the color excluded by the updated three-color sub-pixel data of the previous pixel;

obtaining a second value by determining the second grayscale value of the color of the current pixel;

obtaining a third value by determining the color of the current pixel in accordance with the first value and the second value; and the third grayscale value of the remaining colors of the current pixel equals to the second grayscale value of the corresponding color.

* * * * *